United States Patent
Hranka

(10) Patent No.: US 12,011,808 B2
(45) Date of Patent: Jun. 18, 2024

(54) WORKPIECE SECURING DEVICE

(71) Applicant: Karl F. Hranka, Spearfish, SD (US)

(72) Inventor: Karl F. Hranka, Spearfish, SD (US)

( * ) Notice: Subject to any disclaimer, the term of this patent is extended or adjusted under 35 U.S.C. 154(b) by 314 days.

(21) Appl. No.: 17/317,749

(22) Filed: May 11, 2021

(65) Prior Publication Data

US 2021/0354268 A1 Nov. 18, 2021

Related U.S. Application Data

(60) Provisional application No. 63/023,644, filed on May 12, 2020.

(51) Int. Cl.
| | | |
|---|---|---|
| *B25B 1/24* | (2006.01) | |
| *B23K 9/04* | (2006.01) | |
| *B23P 15/00* | (2006.01) | |
| *B23P 17/00* | (2006.01) | |
| *B23Q 3/06* | (2006.01) | |
| *B25B 1/02* | (2006.01) | |
| *B25B 5/16* | (2006.01) | |
| *B23K 26/342* | (2014.01) | |

(52) U.S. Cl.
CPC ............. *B25B 1/2405* (2013.01); *B23K 9/04* (2013.01); *B23P 15/00* (2013.01); *B23P 17/00* (2013.01); *B23Q 3/062* (2013.01); *B25B 1/241* (2013.01); *B25B 5/163* (2013.01); *B23K 26/342* (2015.10)

(58) Field of Classification Search
CPC ....... B25B 1/2405; B25B 5/163; B25B 1/241; B25B 1/103; B23K 9/04
See application file for complete search history.

(56) References Cited

U.S. PATENT DOCUMENTS

| | | | | |
|---|---|---|---|---|
| 2,703,502 A | * | 3/1955 | Adair | .................... B25B 13/505 |
| | | | | 81/426 |
| 3,811,668 A | * | 5/1974 | Kotter | .................... B25B 5/163 |
| | | | | 269/276 |
| 4,128,929 A | * | 12/1978 | DeMusis | ................. B23P 6/002 |
| | | | | 451/365 |

(Continued)

FOREIGN PATENT DOCUMENTS

| | | | |
|---|---|---|---|
| DE | 102016113848 | * | 7/2016 |
| WO | WO 2017103849 | * | 6/2017 |
| WO | WO 2017103849 A1 | * | 6/2017 |

OTHER PUBLICATIONS

KSD (Making Soft Jaws for Vise Grips (HD); Published on Feb. 5, 2014 at https://www.youtube.com/watch?v=U-OwGzV47sc) (Year: 2014).*

(Continued)

*Primary Examiner* — Mahdi H Nejad
(74) *Attorney, Agent, or Firm* — Morrison & Foerster LLP

(57) ABSTRACT

This disclosure is directed to a method for forming and using one or more workpiece securing devices to reduce the deflections and vibrations of the workpiece during machining, as well as the time and labor associated with machining multiple workpieces. The method includes depositing material onto a surface of a movable jaw of a vise to form a first jaw protrusion and depositing material onto a surface of a stationary jaw of the vise to form a second jaw protrusion. A workpiece can be secured between the first and second jaw protrusions and then can be machined.

8 Claims, 7 Drawing Sheets

(56) References Cited

U.S. PATENT DOCUMENTS

| | | | | | |
|---|---|---|---|---|---|
| 4,971,301 | A | * | 11/1990 | Yang | B25B 1/2436 269/247 |
| 6,427,995 | B1 | * | 8/2002 | Steinwall | B25B 1/2405 269/283 |
| 6,530,567 | B1 | * | 3/2003 | Lang | B25B 1/2405 269/257 |
| 7,600,450 | B2 | * | 10/2009 | Montgomery | E21B 33/129 81/57.33 |
| 9,937,589 | B2 | * | 4/2018 | Soshi | G05B 19/4155 |
| 2010/0230884 | A1 | * | 9/2010 | Nelson | B25B 1/2405 269/329 |
| 2014/0117606 | A1 | * | 5/2014 | Bronzino | B25B 1/241 269/265 |

OTHER PUBLICATIONS

Tormach Inc. Soft Jaw Work Holding Fixtures; https://www.youtube.com/watch?v=dap3T1qmElg; Published on Nov. 16, 2017 (Year: 2017).*

* cited by examiner

WORKPIECE SECURING DEVICE

CROSS REFERENCE TO RELATED APPLICATIONS

This application claims the benefit under 35 USC 119(e) of U.S. Provisional Patent Application No. 63/023,644, filed May 12, 2020, the contents of which are incorporated herein by reference its entirely for all purpose.

FIELD OF THE DISCLOSURE

This disclosure relates to a workpiece securing device and methods for operation thereof. This disclosure also relates to methods for manufacturing the disclosed workpiece securing device.

BACKGROUND OF THE DISCLOSURE

Vises are commonly used in machine and woodworking shops to secure a workpiece for a mill or a computer numerical control ("CNC") machine, for example. Securing a workpiece in a vise reduces deflections and vibrations of the workpiece during machining, which in turn may improve the likelihood that the finished workpiece meets the targeted properties for the finished product. In modern machine shops, CNC machines may be used to produce a large volume of parts. For example, CNC machines can execute a computer program that controls tools to machine a workpiece in accordance with instructions in the computer program. Although CNC machines can be automated to machine multiple parts, securing a workpiece in a vise requires using jaw attachments. In some instances, the jaw attachments may need to be custom machined in order to accommodate irregularly shaped workpieces such that the deflections and vibrations during machining are minimal.

Vise jaws typically include two blocks arranged in parallel, such that the blocks have inwardly facing parallel surfaces. As a result, securing irregularly shaped workpieces (e.g., workpieces that do not have parallel flat sides) to the vise jaws can be difficult. For example, to secure an irregularly shaped workpiece, a technician can make custom jaw attachments that can be fastened to the vice jaws. Making custom jaw attachments can involve complicated processes and can be time consuming and costly.

The technician may also use standardized one-size-fits-all type jaw attachments fastened to the vice jaws to secure the workpiece. However, such jaw attachments may not be suitable for holding a variety of irregularly shaped workpieces. In cases where one or more workpieces to be machined have different shapes and/or are irregularly shaped, it may be desirable to have a securing device for a workpiece that can be quickly manufactured and can securely hold a variety of irregularly shaped workpieces.

A workpiece can be secured in a vise using a manual process. For example, while preparing a vise to secure a workpiece to be machined, a technician may fasten a set of jaw attachments to the vise jaws and secure the workpiece in the vise. To machine another workpiece, the technician may remove (e.g., unclamp) the finished workpiece from the vise and secure a new, unfinished workpiece. Each time a finished workpiece is removed from the vise, a technician has to manually remove the finished workpiece from the vice jaws. If the next unfinished workpiece to be machined has a different shape, the technician has to remove the first set of jaw attachments (used to previously machine the finished workpiece) and fasten a second set of jaw attachments. The technician then has to manually secure the unfinished workpiece in the vise. This manual process would need to be repeated for each workpiece to be machined. Manually fastening the jaw attachments to the vise jaws and manually replacing machined workpieces with unfinished workpieces can be time intensive and can involve laborious processes. For example, some machining tasks may require fastening multiple sets of jaw attachments and replacing hundreds of workpieces.

In some instances, the jaw attachments may be fastened to the vise jaws using fasteners, such as screws, bolts, nuts, etc. The deflections and vibrations caused by the machining of a workpiece may cause these fasteners to loosen. As a result, the technician may have to make adjustments (e.g., to the fasteners, to the jaw attachments, etc.) each time and before a new, unfinished workpiece is secured in the vice. These adjustments further add to the time and labor associated with machining multiple workpieces.

BRIEF SUMMARY OF THE DISCLOSURE

To solve the above-disclosed problems, embodiments of the disclosure are directed to a workpiece securing device including jaw protrusions and vice jaws. The jaw protrusions may each be formed of a single piece of material that is integrated into a vice jaw. This single piece of material may eliminate the need for manually fastening and unfastening multiple portions (e.g., a custom machined portion and a removably fastened portion) of the jaw attachments to and from the vise jaws. Additionally, the single piece of material may eliminate the need to separately machine custom portions of the jaw attachments.

In some embodiments, the jaw protrusions may be formed as parts integrated in the vise jaws using, e.g., a 3D printing or welding process. Because the jaw protrusions are integrated in the vise jaws, they do not need fasteners to be fastened to the vice jaws. Without such fasteners, vibrations imparted to the vise during machining may not cause the jaw protrusions to become loose. As a result, the need for manual adjustments (e.g., tightening the fasteners), as is the case when jaw attachments are used, may be eliminated. The amount of time a technician may spend making manual adjustments between machining multiple workpieces may be reduced.

Additionally, the jaw protrusions can be formed on the top surfaces of the vice jaws. As a result, after the jaw protrusions are formed, the workpiece securing device is ready to receive a workpiece. No other parts need to be fastened to the workpiece securing device, and no adjustments to the jaw protrusions are needed. Immediately after the jaw protrusions are formed, an unfinished workpiece can be placed between the vise jaws, and the vise jaws can be moved to securely hold the unfinished workpiece.

Furthermore, the jaw protrusions may be formed with physical properties that correspond to those of the unfinished workpiece. The jaw protrusions may have one or more surfaces that follow the contours of the unfinished workpiece, for example. By following the contours of the unfinished workpiece, the workpiece securing device can have a more firm grip of the workpiece.

Embodiments of the disclosure include using a CNC machine having one or more robotic arms to secure and remove workpieces in the workpiece securing device. In some embodiments, the CNC machine and the robotic arms may be used to remove finished workpieces from and/or secure unfinished workpieces between the jaw protrusions of the workpiece securing device. To remove the finished workpieces from and to secure unfinished workpieces between the jaw protrusions, the CNC machine may execute a program that moves the movable vise jaw accordingly. To machine each workpiece, the CNC machine may run the same program to produce workpieces having similar or different physical properties (e.g., shapes, sizes, etc.) The automation of one or more steps included in preparing, securing, machining, and removing workpieces may reduce the amount of manual labor and time for machining multiple workpieces.

DETAILED DESCRIPTION OF THE INVENTION

Figure 1:
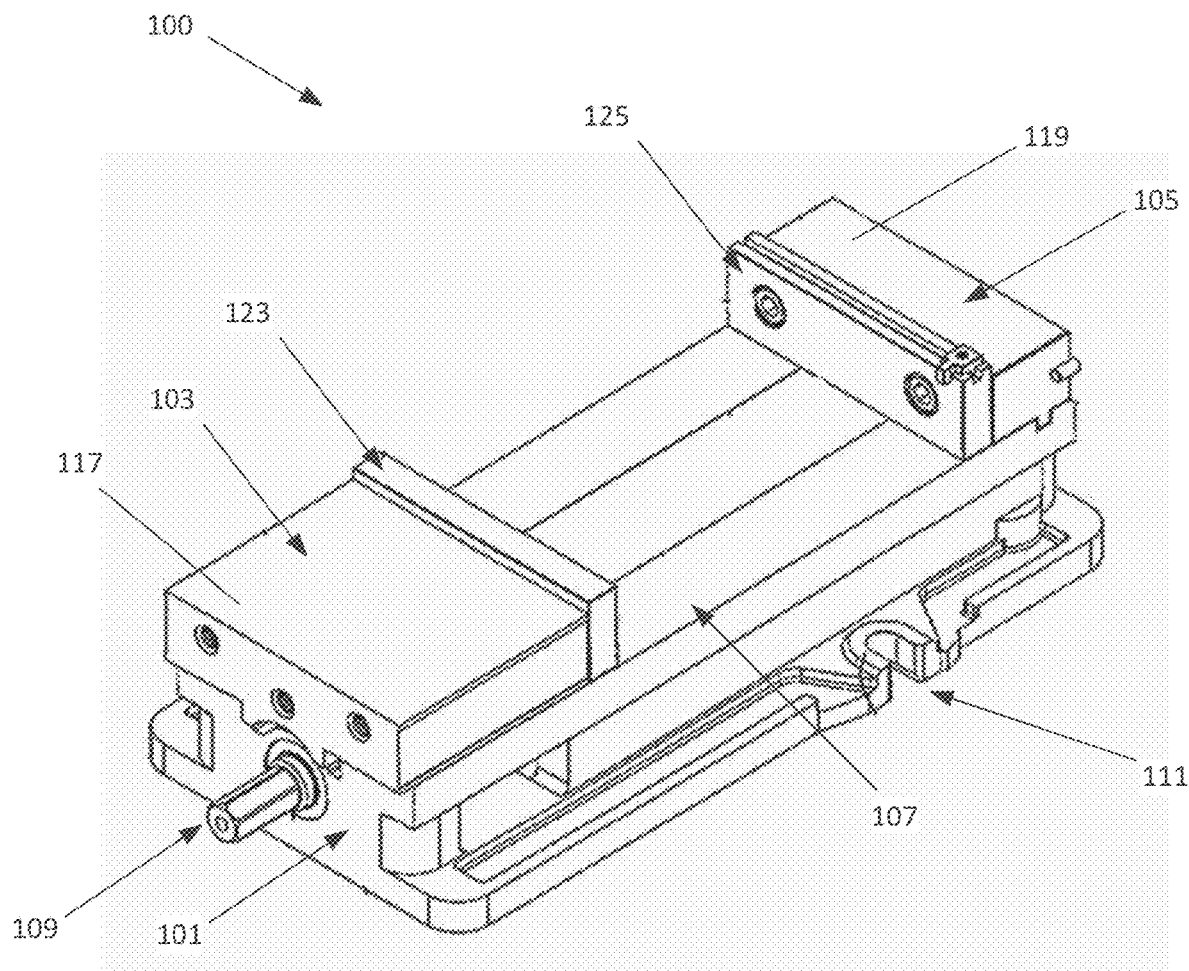
FIG. 1 illustrates a plan view of an example vise including jaw attachments that secure a regularly shaped workpiece.

Disclosed herein is a workpiece securing device including jaw protrusions and vice jaws. The jaw protrusions may each be formed of a single piece of material that is integrated into a vice jaw. This single piece of material may eliminate the need for manually fastening and unfastening multiple portions (e.g., a custom machined portion and a removably fastened portion) of the jaw attachments to and from the vise jaws. Additionally, the single piece of material may eliminate the need to separately machine custom portions of the jaw attachments.

In some embodiments, the jaw protrusions may be formed as parts integrated in the vise jaws using, e.g., a 3D printing or welding process. Because the jaw protrusions are integrated in the vise jaws, they do not need fasteners to be fastened to the vice jaws. Without such fasteners, vibrations imparted to the vise during machining may not cause the jaw protrusions to become loose. As a result, the need for manual adjustments (e.g., tightening the fasteners), as is the case when jaw attachments are used, may eliminated. The amount of time a technician may spend making manual adjustments between machining multiple workpieces may be reduced.

Additionally, the jaw protrusions can be formed on the top surfaces of the vice jaws. As a result, after the jaw protrusions are formed, the workpiece securing device is ready to receive a workpiece. No other parts need to be fastened to the workpiece securing device, and no adjustments to the jaw protrusions are needed. Immediately after the jaw protrusions are formed, an unfinished workpiece can be placed between the vise jaws, and the vise jaws can be moved to securely hold the unfinished workpiece.

Furthermore, the jaw protrusions may be formed with physical properties that correspond to those of the unfinished workpiece. The jaw protrusions may have one or more surfaces that follow the contours of the unfinished workpiece, for example. By following the contours of the unfinished workpiece, the workpiece securing device can have a more secure grip on the workpiece.

Embodiments of the disclosure include using a CNC machine having one or more robotic arms to secure and remove workpieces in the workpiece securing device. In some embodiments, the CNC machine and the robotic arms may be used to remove finished workpieces from and/or secure unfinished workpieces between the jaw protrusions of the workpiece securing device. To remove the finished workpieces from and to secure unfinished workpieces between the jaw protrusions, the CNC machine may execute a program that moves the movable vise jaw and the stationary vise jaw accordingly. To machine each workpiece, the CNC machine may run the same, i.e., a single, program to produce workpieces having similar or different physical properties (e.g., shapes, sizes, etc.) The automation of one or more steps included in preparing, securing, machining, and removing workpieces may reduce the amount of manual labor and time for machining multiple workpieces.

In the following description, reference is made to the accompanying drawings which form a part hereof, and in which it is shown by way of illustration specific examples that can be practiced. It is to be understood that other examples can be used and structural changes can be made without departing from the scope of the disclosed examples.

FIG. 1 illustrates a plan view of an example vise including jaw attachments that secure a regularly shaped workpiece. Vise 100 includes a vise body 101 having a movable vise jaw 103 and a stationary vise jaw 105. A workpiece (not shown) can be located between the movable jaw 103 and the stationary vise jaw 105 when secured by the vise 100. The movable vise jaw 103 can be coupled to the vise body 101 along guideway 107. In this manner, the movable vise jaw 103 can move along the guideway 107 to adjust the distance between the movable vise jaw 103 and the stationary vise jaw 105. For example, turning vise screw 109 can cause the movable vise jaw 103 to move along the guideway 107 either toward (e.g., to secure the workpiece) or away from (e.g., to remove the workpiece) the stationary vise jaw 105. In some embodiments, the distance between the movable vise jaw 103 and the stationary vise jaw 105 can be the distance between corresponding surfaces that would contact the workpiece when secured by the vise 100. Other mechanisms may also be used to move movable vise jaw 103 along the guideway 107.

The vise 100 can be fastened to a workbench, e.g., of a CNC machine or a manual mill. For example, the vise body 101 may include one or more flanges 111 used to secure the vise 100 to a workbench or work station.

The movable vise jaw 103 and the stationary vise jaw 105 may include surfaces facing and parallel to each other. The movable vice jaw 103 may include a jaw attachment 123. For example, the jaw attachment 123 may be removably fastened to the movable vise jaw 103. For example, the jaw attachment 123 may be attached to the parallel surface facing the stationary vise jaw 105. The stationary vise jaw 105 similarly can include a jaw attachment 125. The jaw attachment 125 may be removably fastened to the stationary vise jaw 105. The jaw attachment 125 may be attached to the parallel surface facing the movable vise jaw 103, for example.

As used throughout the disclosure, the term "movable vise jaw" may be referred also as a "movable jaw" or a "movable jaw of the vise." Although the figure illustrates one movable vise jaw and one stationary vise jaw, in some embodiments, a vise may include any number of movable vise jaws, such as two, and any number of stationary vice jaws, such as zero. As used throughout the disclosure, the term "removably fasten" may refer to a part that is capable of being attached and detached without deforming or destroying the part. For example, "removably fasten" may be used to describe attaching a part with a fastener, such as a screw or bolt. Another non-limiting example of a fastener may be a female depression configured to receive a male protrusion.

Each component of the vise 100 can also include a top surface, for example, the movable vise jaw 103 can include a top surface 117, and the stationary vise jaw 105 can include a top surface 119. The top surfaces 117 and 119 can be planar surfaces.

Vise 100 may be used to secure a workpiece that includes parallel opposing surfaces. For example, the workpiece could be placed between the jaw attachments 123 and 125, and the movable vise jaw 103 may be positioned (e.g., moved along guideway 107) to grip the workpiece between the jaw attachments 123 and 125. Because the surfaces of jaw attachments 123 and 125 may be substantially parallel, vise 100 may not be able to grip an irregularly shaped workpiece, i.e., a workpiece that does not include a pair of substantially parallel surfaces.

Figure 2:
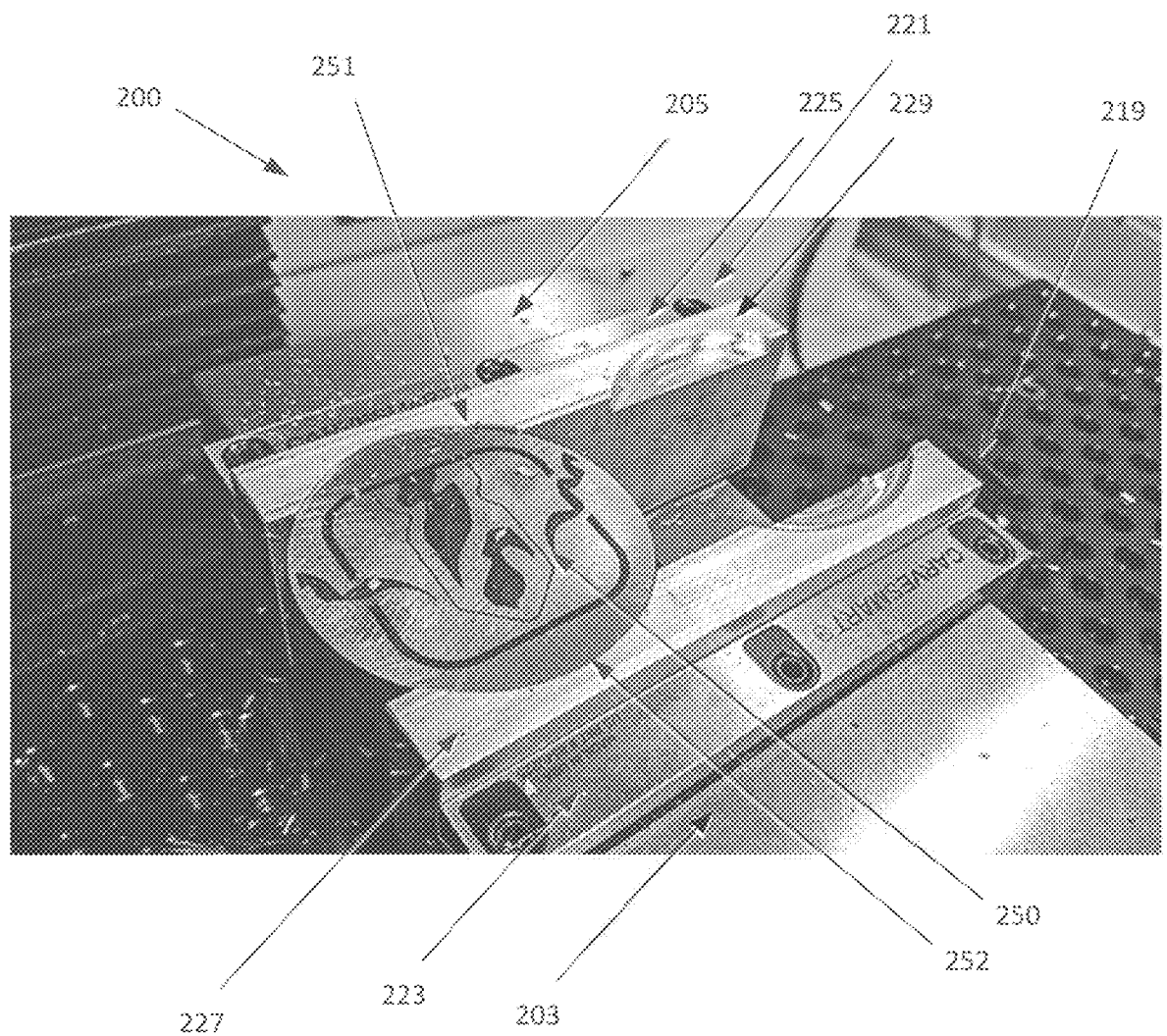
FIG. 2 illustrates a plan view of an example vise including jaw attachments having a plurality of portions that secure an irregularly shaped workpiece.

FIG. 2 illustrates a plan view of an example vise including jaw attachments having a plurality of portions that secure an irregularly shaped workpiece. Irregularly shaped workpiece 250 may be clamped in place between the jaws of the vise 200. Specifically, the vise 200 may include a set of jaw attachments 219 and 221, each having a custom machined portion and a removably fastened portion. The first jaw attachment 219 may be located on one side of the vise 200, e.g., near movable vise jaw 203, and the second jaw attachment 221 may be located on another side of the vise 200, e.g., near stationary vise jaw 205.

The first jaw attachment 219 may include a custom machined portion 227 coupled to a removably fastened portion 223. The second jaw attachment 221 may include a custom machined portion 229 coupled to a removably fastened portion 225. The custom machined portions 227 and 229 of the set of jaw attachments 219 and 221, respectively, permit the vise 200 to secure an irregularly shaped workpiece between the jaws of the vise 200.

The custom machined portion 227 of the first jaw attachment 219 can be machined to correspond to a shape of a first contact portion 252, e.g., a side surface, of the workpiece 250. The custom machined portion 227 of the first jaw attachment 219 can be machined using, for example, a mill or CNC machine such that its finished surface (discussed below) can abut the first contact portion 252 of the workpiece 250.

The custom machined portion 229 of the second jaw attachment 221 can be similarly manufactured to correspond to a shape of a second contact portion 251, e.g., a second side surface, of the workpiece 250. In some embodiments, the second contact portion 251 may be on an opposite side of the workpiece 250 from the first contact portion 252. The custom machined portion 229 of the second jaw attachment 221 can be machined such that its finished surface (discussed below) can abut the second contact portion 251 of the workpiece 250.

Similar to the jaw attachments 123 and 125 as described above with respect to FIG. 1, the removably fastened portions 223 and 225 of the jaw attachments 219 and 221, respectively, may be fastened to a movable vise jaw 203 and a stationary vise jaw 205, respectively.

Using the vise configuration shown in FIG. 2 can be labor and time intensive. For example, the custom machined portions 227 and 229 of the jaw attachments 219 and 221, respectively, are typically manufactured separately from the removably fastened portions 223 and 225. That is, the custom machined portion 227 of the jaw attachment 219 may be machined from a first piece of material and then removed from the machining equipment. The custom machined portion 229 of the jaw attachment 221 can then be secured to the workbench of the machining equipment, and machined from a second piece of material. Once manufactured, the custom machined portions 227 and 229 may each be fastened to a respective removably fastened portion 223 and 225. For example, the custom machined portions 227 and 229 can be fastened with bolts, screws, or other fastener, onto the removably fastened portions 223 and 225, as described above. The jaw attachments 219 and 221 are fastened, in turn, to the movable vise jaw 203 and stationary jaw 205, respectively.

Alternatively, the removably fastened portions 223 and 225 may first be fastened to the jaws 203 and 205, respectively, prior to the custom machined portions 227 and 229 being fastened to the removably fastened portions 223 and 225. That is, the custom machined portions 227 and 229 may be fastened to the respective removably fastened portions 223 and 225 when the removably fastened portions are attached to the vise jaws 203 and 205, respectively.

When machining workpieces, each workpiece may be manually secured in and removed from the custom machined portions 227 and 229 of the jaw attachments 219 and 221, respectively, which can be time and labor intensive. For example, a technician may have to manually open the vise jaws (e.g., by moving the movable vise jaw 203 to increase the distance between the movable vise jaw 203 and the stationary vise jaw 205), remove the workpiece 250, place a new workpiece in the vise 200, and manually secure the new workpiece in place (e.g., by moving the movable vise jaw 203 to decrease the distance between the movable vise jaw 203 and the stationary vise jaw 205). Due to the vibrations imparted to the vise 200 as the workpiece is machined, the fasteners fastening the custom machined portions 223 and 225 and the fasteners fastening the removably fastened portions 227 and 229 may come loose and require adjustments (e.g., tightening).

Additionally, if multiple workpieces having different shapes are to be machined, new custom machined jaw attachment(s) corresponding to the workpiece with the different shape may have to be machined, and the previous jaw attachments may have to be changed. For example, a first set of workpieces having a first shape may be secured by a first set of jaw attachments and then machined. To machine a second set of workpieces having a second, different shape, a technician may have to manually remove the first set of jaw attachments 219 and 221 from the vise 200 and fasten a different (second) set of jaw attachments. The second set of jaw attachments may be machined separately to correspond to the second set of workpieces having the second shape. Manually removing the first set of workpieces, manually removing the first set of jaw attachments, manually fastening the second set of jaw attachments (including fastening both the custom machined and removably fastened portions), and then manually securing the second set of workpieces can be labor and time intensive.

Figure 3:
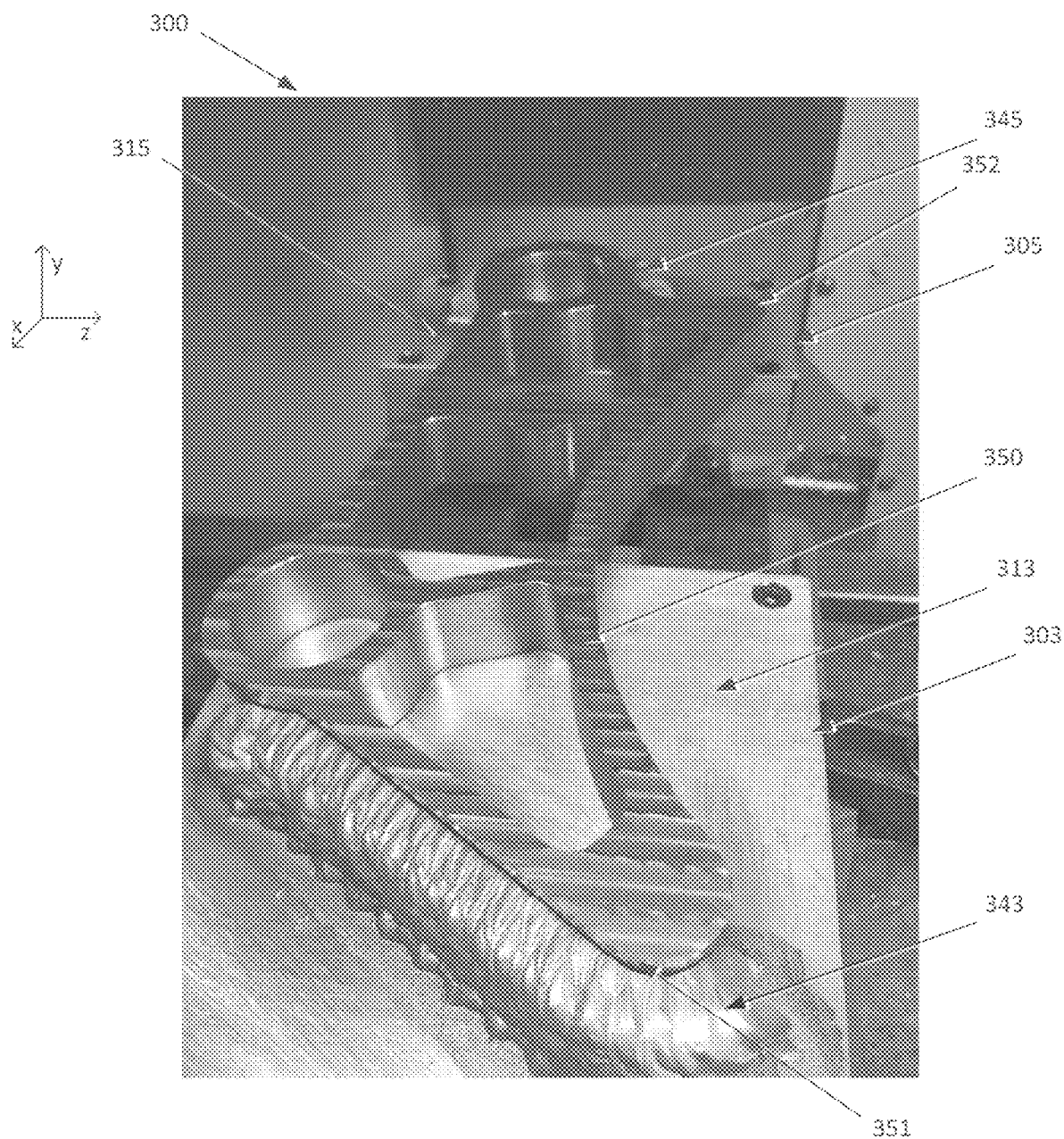
FIG. 3 illustrates a plan view of an example vice securing an irregularly shaped workpiece, according to some embodiments of the disclosure.

FIG. 3 illustrates a plan view of an example workpiece securing device securing an irregularly shaped workpiece, according to some embodiments of the disclosure. Workpiece securing device 300 may include jaw protrusions 343 and 345 to secure a workpiece 350. The first jaw protrusion 343 may be located on one side (e.g., left side) of the workpiece 350, and the second jaw protrusion 345 may be located on another side (e.g., right side) of the workpiece 350. Workpiece securing device 300 may also include a movable vise jaw 303 and a stationary vice jaw 305. The movable vise jaw 303 may be correspondingly similar to the movable vise jaw 203 of FIG. 2, and the stationary vise jaw 305 may be correspondingly similar to the stationary vise jaw 205 of FIG. 2.

The first jaw protrusion 343 may be disposed on (e.g., integrated as part of) the movable vise jaw 303, for example. In some embodiments, the first jaw protrusion 343 may be formed on a top surface 313 of the movable vise jaw 303. Similarly, the second jaw protrusion 345 may be disposed on (e.g., integrated as part of) the stationary vise jaw 305. In some embodiments, the second jaw protrusion 345 may be formed on a top surface 315 of the stationary vise jaw 305.

The first and second jaw protrusions 343 and 345 are unlike the jaw attachments 219 and 221 described with respect to FIG. 2. The first and second jaw attachments 219 and 221 (of FIG. 2) are removably fastened to side, parallel surfaces of the vise 200, whereas the first and second jaw protrusions 343 and 345 (of FIG. 3) are permanently attached to the top surfaces 313 and 315 of the vise jaws 303 and 305, respectively. For example, the first and second jaw protrusions 343 and 345 may be formed from aluminum and deposited onto the top surfaces 313 and 315, respectively, of the vise jaws 303 and 305, respectively.

In other words, each of the first and second jaw protrusions 343 and 345 may each be a single piece of material (e.g., aluminum). The single piece of material may eliminate the need for manually fastening and unfastening multiple portions (e.g., a custom machined portion and a removably fastened portion) of a jaw attachment to and from the vise. Additionally, first and second jaw protrusions 343 and 345 being formed from a single piece of material may eliminate the need to separately machine custom portions of the jaw attachments.

In some embodiments, the first and second jaw protrusions 343 and 345 may be formed as parts integrated in the vise jaws 303 and 305 using, e.g., a 3D printing, welding, laser cladding, laser metal deposition, laser powder deposition, laser engineered shaping deposition, cold spray, and other combinations of energy or feedstock sources. Exemplary energy source may include, but are not limited to, laser, electron beam, electrical discharge arc, propellant gas, and resistive heating. Exemplary feedstock sources may include, but are not limited to, powder, granules, shavings, wire, rod, and filament. Because the jaw protrusions are integrated in the vise jaws 303 and 305, they do not need fasteners to fasten to the vice jaws. As such, embodiments of the disclosure eliminate the need for manually fastening and unfastening jaw attachments to and from the vice jaws. Additionally, vibrations during machining will not loosen any fasteners that may cause jaw attachments to move in response; this eliminates the need to make manual adjustments to, e.g., the jaw attachments.

As used throughout the disclosure, the term "permanently attach" may refer to a part that is attached or affixed to a surface, such that in order to detach or remove the part from the surface, the part or the surface will be deformed or destroyed. For example, "permanently attach" may be used to describe a part that is physically bonded to a surface using a process such as additive manufacturing, welding, soldering, chemical bonding, or the like.

Further, embodiments of the present disclosure may provide a workpiece securing device that uses at least a portion of the top surfaces of the movable and stationary vise jaws to support the workpiece. For example, referring still to FIG. 3, a bottom surface of the workpiece 350 may be in contact with the top surfaces 313 and 315 of the vice jaws 303 and 305, respectively. Supporting the workpiece 350 with the top surfaces 313 and 315 may reduce deflections and vibrations of the workpiece 350 in one direction (e.g., the y-direction) as the workpiece 350 is being machined. This may improve the consistency across multiple machined workpieces. In some embodiments, the first and second jaw protrusions, e.g., 343 and 345 may include an overhang so as to provide an upper constraint for the workpiece in the y-direction. The overhang may provide additional stability to the workpiece during machining.

The first and second jaw protrusions 343 and 345 may be formed in any shape. In some embodiments, the first and second jaw protrusions 343 and 345 may be machined with shapes corresponding to a first contact portion and a second contact portion of the workpiece 350 to be machined. For example, the first jaw protrusion 343 can be formed such that its finished surface (discussed below) can abut a first contact portion 351, e.g., a first side surface, of the workpiece 350.

The second jaw protrusion 345 may be similarly formed to correspond to a shape of a second contact portion 352, e.g., a second side surface, of the workpiece 350. In some embodiments, a finished surface of the second jaw protrusion 345 may abut the second contact portion 352. In some embodiments, the second contact portion 352 may be on an opposite side of the workpiece 350 from the first contact portion 351. For example, the first contact portion 351 can be located on the left side of the workpiece 350, while the second contact portion 352 can be located on the right side of the workpiece. The first and second jaw protrusions 343 and 345 can follow at least some of the contours of the workpiece 350.

In some embodiments, the first and second jaw protrusions 343 and 345 may have corresponding physical properties (e.g., shape, size, curvature, etc.) in one or more dimensions. For example, as discussed above, the first and second jaw protrusions 343 and 345 may have the same shape as the first and second contact portions 351 and 352, respectively. Additionally, in some embodiments, the first and second jaw protrusions 343 and 345 may have a thickness (e.g., distance along the y-direction) that is the same as the workpiece 350. In this manner, the jaw protrusions 343 and 345 may be formed and configured to securely hold a corresponding workpiece 350.

The custom physical properties of the jaw protrusions, such that they follow the contours of the workpiece, can reduce the amount of time required for a technician to manually adjust a workpiece when preparing for the workpiece to be secured by the workpiece securing device. Additionally, by customizing the jaw protrusions to correspond to the physical properties of the workpiece, the workpiece securing device can secure a more firm grip of the workpiece.

Figure 4A:
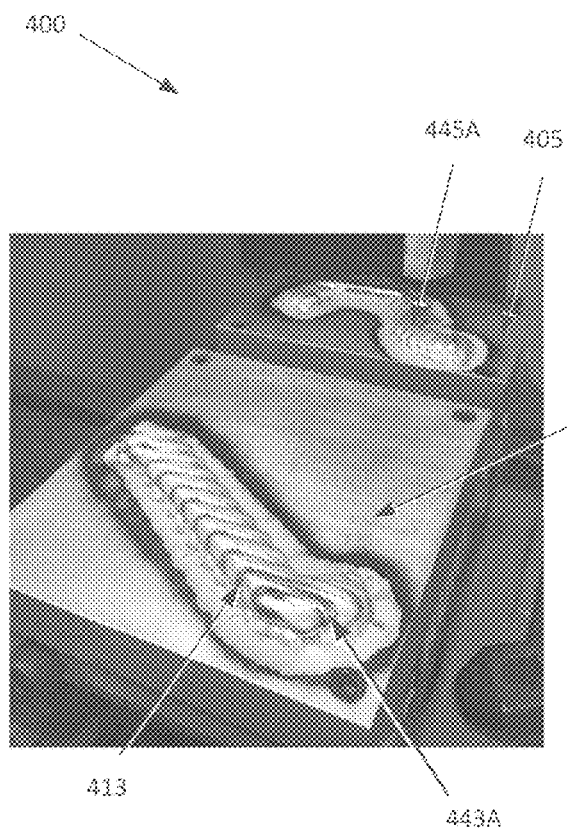
FIGS. 4A-4B illustrate plan views of an example workpiece securing device at multiple steps of being formed, according to some embodiments of the disclosure.
Figure 4B:
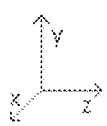
Figure 4B:
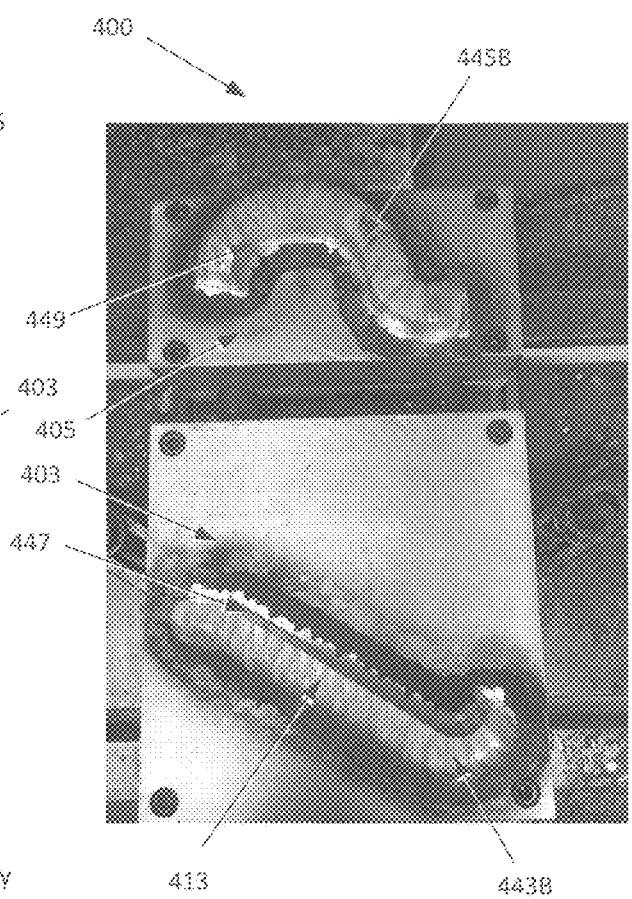

FIGS. 4A and 4B illustrate plan views of an example workpiece securing device at multiple steps of being manufactured, according to some embodiments of the disclosure. FIG. 4A illustrates a portion of a workpiece securing device 400 including a movable vise jaw 403 and a stationary vise jaw 405. A first jaw protrusion 443 (referred to as "443A" when partially formed and "443B" when completely formed) may be formed on the movable vise jaw 403. A second jaw protrusion 445 (referred to as "445A" when partially formed and "445B" when completely formed) may be formed on the stationary vise jaw 405.

FIG. 4A shows a plan view of the vise jaws 403 and 405 while the first and second jaw protrusions 443A and 445A are being formed. As shown in the figure, during formation, the first and second jaw protrusions 443A and 445A may not yet have heights that correspond to the workpiece(s) to be secured by the vise. The first and second jaw protrusions 443A and 445A may be permanently attached to the top surfaces of movable vise jaw 403 and stationary vise jaw 405, respectively. In some embodiments, during formation, the top (e.g., outer) surfaces of the first and second jaw protrusions 443A and 445A may include an uneven (e.g., bumpy) surface finish 413.

FIG. 4B illustrates the workpiece securing device 400 of FIG. 4A, but after the first and second jaw protrusions 443B and 445B have been completely formed. Complete formation of the first and second jaw protrusions 443B and 445B may include depositing enough material until at least a targeted height is achieved and forming finished surfaces 447 and 449, respectively. The finished surfaces 447 and 449 can be a surface that was previously an uneven surface finish 413, but is now an even finished surface due to being machined by, e.g., a mill or a CNC machine. The finished surfaces 447 and 449 may follow the curvature and/or shape of the first and second contact portions 351 and 352, respectively, of the workpiece. Removing the uneven surface finish 413 from the first and second contact portions 351 and 352 may help the workpiece securing device 400 secure a more firm grip of the workpiece (compared to the uneven surface finish 413 being in contact with the workpiece).

Figure 5:
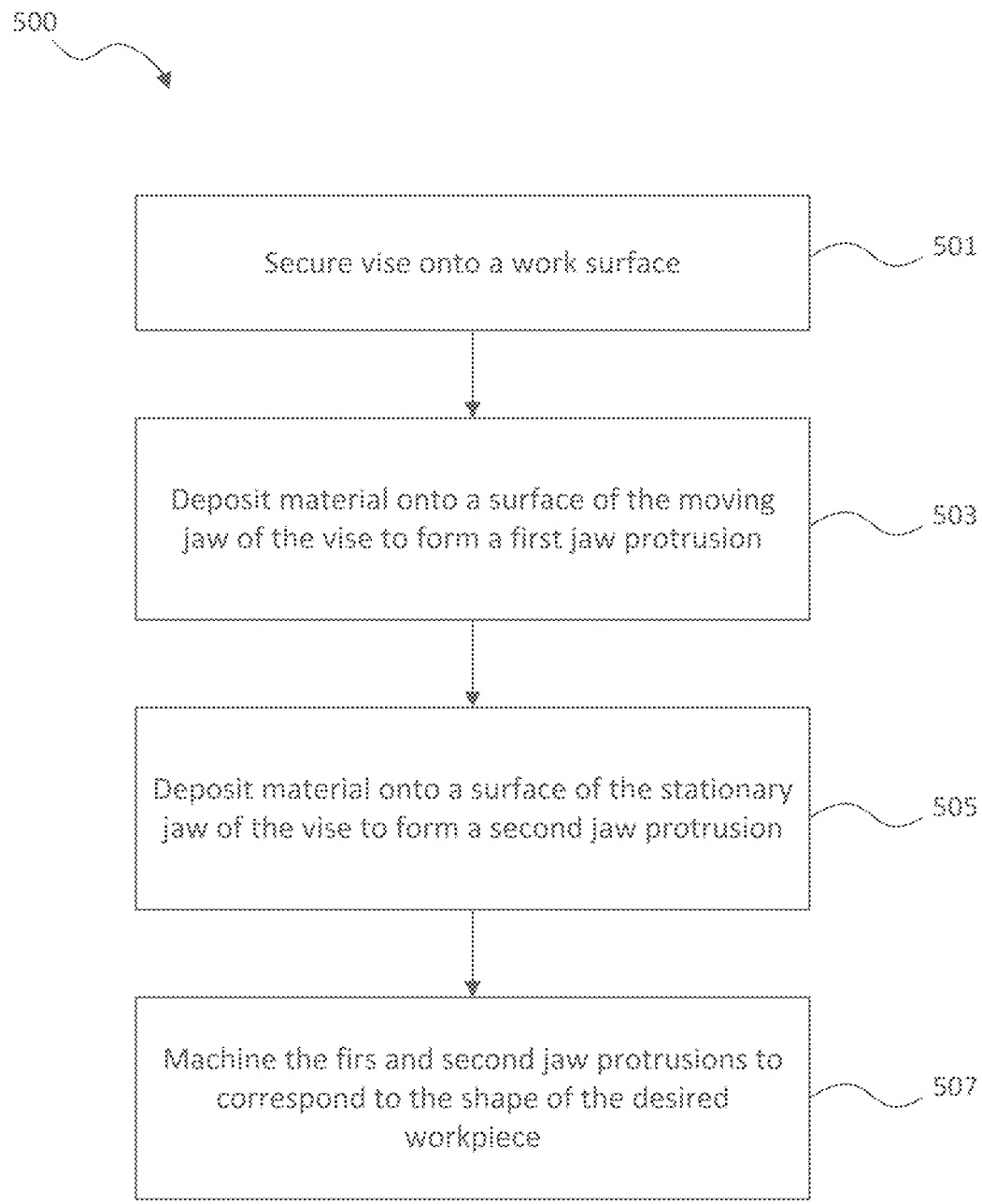
FIG. 5 illustrates a block diagram of an example method for forming a workpiece securing device, according to some embodiments of the disclosure.

FIG. 5 illustrates a block diagram of an example method for manufacturing a workpiece securing device, according to some embodiments of the disclosure. Referring to FIGS. 4A and 5 together, a portion of the workpiece securing device 400, may be secured to a workbench or work surface (step 501). In some embodiments, the workbench may be the same as the one that will be used for machining one or more workpieces, e.g., a work area of a CNC machine. For example, the vice jaws 403 and 405 may be a portion of the workpiece securing device 400 that may be secured to the workbench. Securing the portion of the workpiece securing device 400 may be performed to prevent movement while being manufactured.

Once the portion of the workpiece securing device 400 is secured to the workbench, the first jaw protrusion 443A can be formed by depositing material (e.g., aluminum) on a top surface of the movable vise jaw 403 (step 503). Similarly, the second jaw protrusion 445A can be formed by depositing material on a top surface of the stationary jaw 405 (step 505). A skilled artisan will understand that steps 503 and 505 may be performed in any relative order. For example, step 503 may be performed before (as shown in FIG. 5), at the same time, or after step 505 is performed. The material may be deposited onto the top surface using a 3D printing process, a welding process, a laser cladding process, a laser metal deposition process, a laser powder deposition process, a laser engineered shaping deposition process, a cold spray process, and or any other suitable technique that causes the jaw protrusions 443 and 445 to be permanently attached to the vise jaws 403 and 405, respectively.

In instances where a 3D printing process is used, a program running on the 3D printer may cause the material depositing head to deposit a material on top surfaces of the movable and stationary vice jaws 403 and 405. As described above, aluminum may be used as the deposited material due to its low cost and strength, but other metals and metal alloys such as steel can be used, in some embodiments, a non-metal material may be used as well.

The material may be deposited in a shape corresponding to the shape of the contact portion of the workpiece to be secured. In some embodiments, the material deposited may have a targeted height approximately corresponding to the height of the workpiece, e.g., along the y-axis. The targeted height of the deposited material may alternatively be less than or more than the height of the workpiece. For example, when the cutting forces are relatively small the height of the deposited material may be less than the height of the workpiece. This can reduce the amount of material and time used to form the jaw protrusions. Conversely, when cutting forces are large, the height of the workpiece may be greater than or equal to the workpiece. In this manner, in some embodiments, the amount of material used to form the jaw protrusions may be based, in part, on the forces and dynamics of cutting, the material properties of the jaw protrusions and the workpiece. The material depositing head may deposit both the first jaw protrusion 403 and the second jaw protrusion 405, concurrently or sequentially.

Referring to FIG. 4A, in some embodiments, the material depositing head may quickly deposit the material, e.g., the printing speed may be fast, and/or the diameter of material being deposited may be relatively large. As a result, the outer surface of the jaw protrusions 443A and 445A may have an uneven (e.g., bumpy) surface finish 413.

Referring to FIGS. 4B and 5 together, the first jaw protrusion 443A, and the second jaw protrusion 445A can be machined to correspond to the shape of the contact portions of the desired workpiece (step 507). Additionally or alternatively, in step 507, the surfaces of the first and second jaw protrusions 443A and 445A can be machined to remove the uneven surface finish 413.

Step 507 may also be used to form the shape of the first and second jaw protrusions 443 and 445. For example, the first and second jaw protrusions 443 and 445 may be machined such that it has one or more surfaces that correspond to one or more curvatures of one or more side surfaces of the workpiece to be secured.

Machining the jaw protrusions can create a first smooth (e.g., even and not bumpy) contact surface 447 on the first jaw protrusion 443B, and a second smooth contact surface 449 on the second jaw protrusion 445B. In other words, machining the jaw protrusions removes the coarse and uneven surface finish that may result from the deposition of material on the top surface of the vise jaws 403 and 405. The smooth contact surfaces 447 and 449 may help the workpiece securing device 400 secure a more firm grip on the workpiece. By securing a firm grip on the workpiece, the amount of deflections and vibrations to the workpiece while being machined may be reduced.

In some embodiments, once the material is deposited on the top surfaces of the movable vise jaw 403 and the stationary vice jaw 405, the workpiece securing device 400 may be ready to receive the workpiece. After step 507, the jaw protrusions 443 and 445 may include contact surfaces suitable for securely holding a corresponding workpiece without additional machining, e.g., the contact surface does not have an uneven finish.

Machining the uneven surface finish of the jaw protrusions may be performed by a mill or a CNC machine. In some embodiments, the same CNC machine may deposit the material that form the jaw protrusions 443A and 445A. In some embodiments, the same CNC machine may be used to create the smooth contact surfaces 447 and 449 of the jaw protrusions 443 and 445, respectively. In such instances, the jaw protrusions 443 and 445 can be completely formed on the top surfaces of the corresponding movable and stationary vice jaws 403 and 405. The result of the complete formation of the jaw protrusions 443 and 445 is the workpiece securing device 400. Consequently, a technician does not have to separately fasten a portion (e.g., jaw attachments) of the workpiece securing device 400 in order to be able to subsequently secure a workpiece.

According to embodiments of the disclosure, a CNC machine can execute one or more programs to form and/or position the jaw protrusions 443 and 445. For example, the CNC machine may execute a first program to deposit material on the top surfaces of the vise jaws 403 and 405 to form the jaw protrusions 443 and 445. The CNC machine may also execute a second program, or the same program, to create smooth contact surfaces 447 and 449, e.g., via machining, for the jaw protrusions 443 and 445. In some embodiments, the CNC machine may execute another program, or the same program, to position and/or secure the workpiece in the jaw protrusions 443 and 445.

In some examples, the program may include a single program, e.g., to deposit the jaw protrusions and machine the smooth contact surfaces. Using a program executed on a CNC machine to manufacture a customized workpiece securing device, according to embodiments of the disclosure, may reduce the amount of time and labor required to produce multiple machined workpieces. For example, the jaw protrusions can be formed and machined simultaneously.

Figure 6:
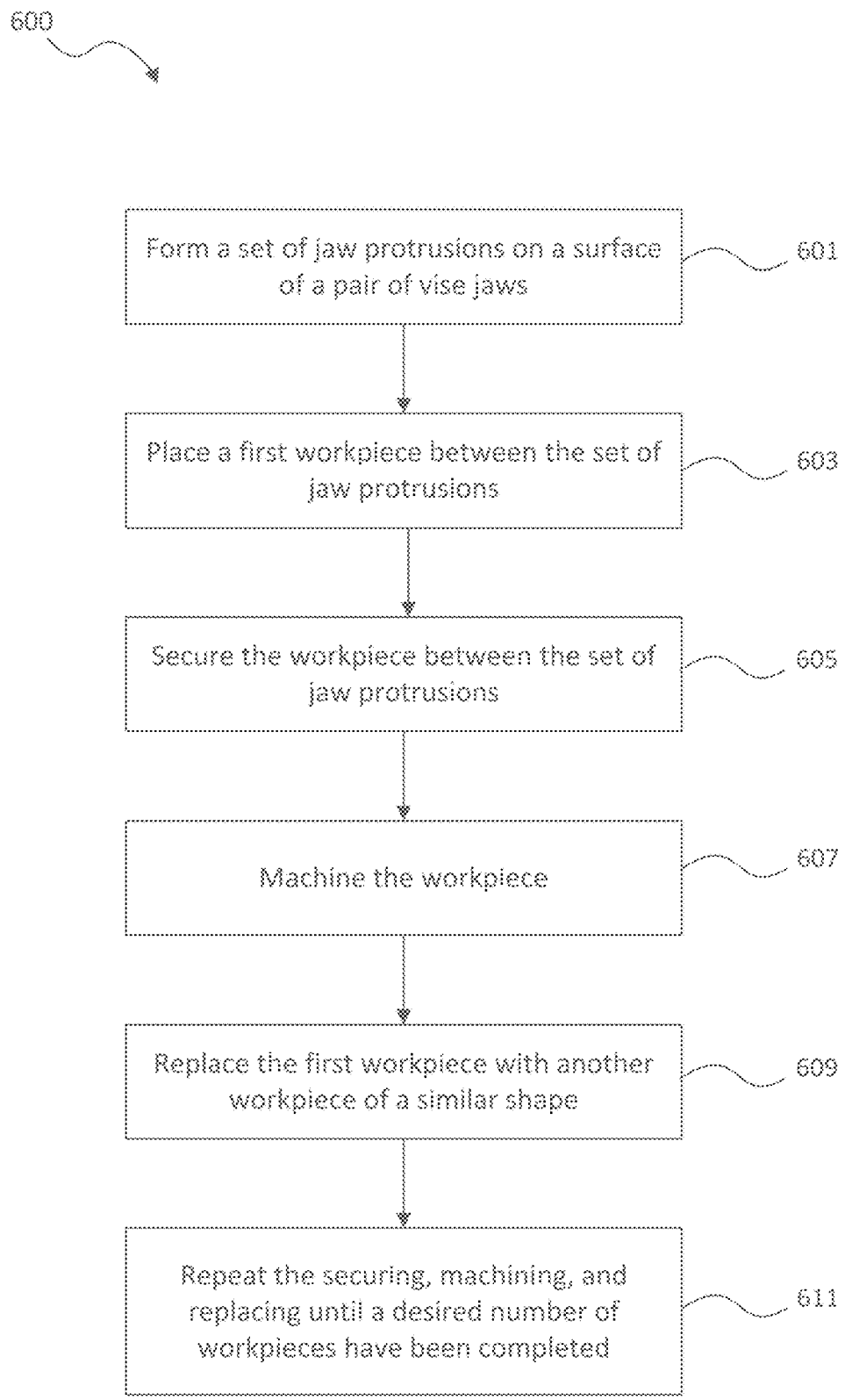
FIG. 6 illustrates a block diagram of an example method for forming and using a workpiece securing device, according to some embodiments of the disclosure.

FIG. 6 illustrates a block diagram of an example method of forming and using a workpiece securing device, according to some embodiments of the disclosure. A set of jaw protrusions may be formed (step 601). Forming the set of jaw protrusions may correspond to the description provided with respect to FIG. 5.

A first unfinished workpiece can be placed between the jaw protrusions (step 603). In some embodiments, a technician may manually place the first unfinished workpiece between the jaw protrusions. In other embodiments, one or more robotic arms associated with a CNC machine can place the first unfinished workpiece between the jaw protrusions in the workpiece securing device. For example, the one or more robotic arms may have access to the unfinished workpiece(s), so it can grab and move the unfinished workpiece(s) to the jaw protrusions.

Once the unfinished workpiece is placed between the jaw protrusions, the unfinished workpiece may be secured in place (step 605). For example, the CNC machine may be able to move the movable vise jaw to secure the workpiece between the movable and stationary vise jaws. The first unfinished workpiece may be machined (step 607), for example, by a CNC machine to produce a first machined workpiece. Alternatively, the first unfinished workpiece may be machined by a mill.

Once the first machined workpiece has been completed, the first machined workpiece may be removed and replaced with a new, unfinished workpiece of a similar shape (step 609). The new, unfinished workpiece may be secured in place and machined. In some embodiments, the new, unfinished workpiece may be machined in a similar manner to the first machined workpiece. For example, a CNC machine may run the same program that machined the first unfinished workpiece to then machine the new, unfinished workpiece to produce substantially similar machined workpieces.

In some embodiments, the new, unfinished workpieces may be machined in a different manner, e.g., to produce a machined workpiece that is not identical to the first machined workpiece. For example, a CNC machine may run a program with instructions to machine the new, unfinished workpiece differently than the first unfinished workpiece to produce different machined workpieces. For example, the first workpiece may be machined to include a single female threaded connection, while the second workpiece may be machined to include two female threaded connections. The differences in location and type of machining between workpieces are not limited to the provided example.

The process of securing a new workpiece, machining the new workpiece, and replacing the new workpiece may be repeated until a desired number of workpieces have been completed (step 611). For example, if it is desired to produce 100 machined workpieces, step 611 can be repeated until 100 machined workpieces have been completed. Since the same jaw protrusions can be used for machining multiple workpieces and adjustments to the jaw protrusions are not required, the amount of manual labor and time associated with machining a large number of workpieces having the same shape can be reduced.

In some embodiments, the process described in FIG. 6 may be automated. For example, as described above with respect to FIG. 5, one or more robotic arms may have access to the unfinished workpieces. The robotic arm(s) can grab, move, and/or place the unfinished workpieces in the CNC machine. The CNC machine can be programmed to secure the workpiece in place by moving the movable vise jaw. The CNC machine can machine the workpiece and move the movable vise jaw to allow the one or more robotic arms to grab and remove the machined workpiece. The one or more robotic arms may then grab an unfinished workpiece, secure it in place, and then repeat this process for a desired number of workpieces. In some embodiments, the instructions for automating this process may be included in one or more programs uploaded to the CNC machine.

Figure 7:
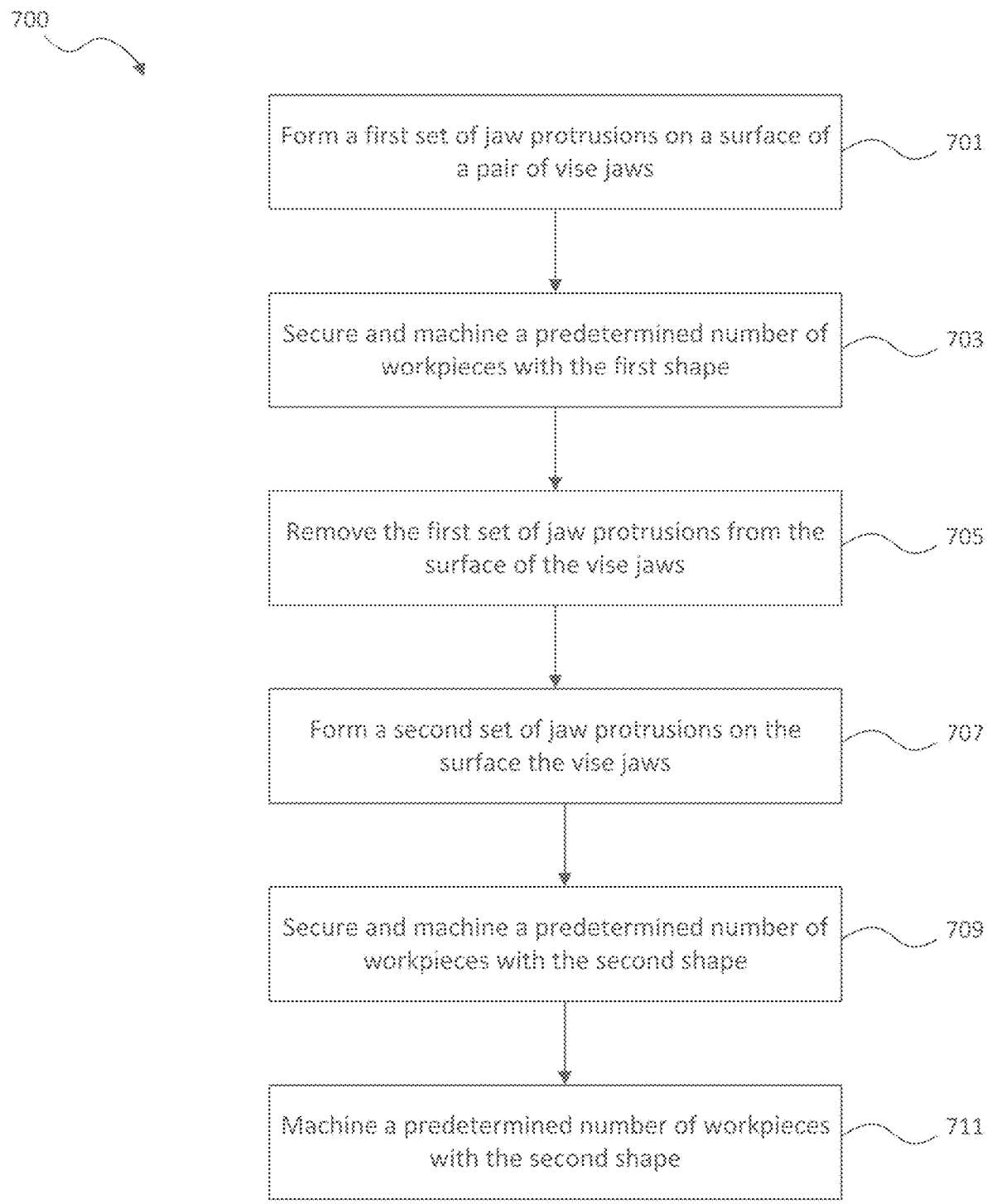
FIG. 7 illustrates a block diagram of an example method for forming and using multiple workpiece securing devices, according to some embodiments of the disclosure.

FIG. 7 is a block diagram of a method of forming and using two or more workpiece securing devices for machining multiple batches, according to some embodiments of the disclosure. A first workpiece securing device having a first set of jaw protrusions may be formed (step 701). Forming the first set of jaw protrusions may correspond to the description provided with respect to FIG. 5. A plurality of unfinished (first) workpieces can be sequentially secured between the stationary and movable jaw protrusions and machined (step 703). The plurality of unfinished workpieces may each have a first shape that corresponds to the shape of the first set of jaw protrusions. The securing and machining steps may be performed as described above with respect to FIG. 6. That is, multiple workpieces may be secured between the jaw protrusions and subsequently machined.

Once the desired number of workpieces having a first shape are machined, the first set of jaw protrusions may be removed from the top surfaces of the vise jaws (step 705). For example, the first set of jaw protrusions may be cut or machined off the top surface of the vise jaws with a CNC machine or mill. In some embodiments, after step 705, the top surface of the vise jaws may be flat without any material protruding from them.

Once the first set of jaw protrusions is removed, a second workpiece securing device having a second set of jaw protrusions may be formed (step 707). Forming the second set of jaw protrusions may correspond to the description provided with respect to FIG. 5. In some embodiments, the vise jaws used for the first set of jaw protrusions (of the first workpiece securing device) may be reused for the second set of jaw protrusions (of the second workpiece securing device).

A plurality of unfinished (second) workpieces can be sequentially secured between the second set of jaw protrusions and machined (step 709). The plurality of unfinished workpieces may each have a second shape that corresponds to the shape of the second jaw protrusions. The second shape may be different from the first shape. The securing and machining steps may be performed as described above with respect to FIG. 6. A desired number of workpieces having the second shape can be machined (step 711).

The process of forming jaw protrusions, machining workpieces corresponding to the shape of the jaw protrusions, and removing the jaw protrusions may be repeated as desired. Additionally, the process described in FIG. 7 may be automated such that a CNC machine with 3D printing capabilities may be configured to form the jaw protrusions. The CNC machine may also be configured to move, secure, and machine workpieces, along with removing jaw protrusions. In other words, the same CNC machine can be used to form the jaw protrusions and machine the workpieces according to a program, e.g., automatically. In this manner, methods in accordance with the disclosure can reduce the amount of time and materials associated with machining batches of multiple workpieces. The methods may also reduce the amount of time and materials associated with machining multiple batches of workpieces, where each batch may be associated with a workpiece having a different shape.

Moreover, the workpiece securing device may secure a more firm grip (e.g., with less deflection and vibration) on the workpieces during machining because at least a portion of the workpiece may be supported by one or more top surfaces of one or more vise jaws.

This disclosure is directed to a method for forming and using one or more workpiece securing devices. The method includes depositing material onto a surface of a movable jaw of a vise to form a first jaw protrusion. Material may also be deposited onto a surface of a stationary jaw of the vise to form a second jaw protrusion. A workpiece may be secured between the first and second jaw protrusions. The secured workpiece may be machined.

In some embodiments, securing the workpiece may also include placing the workpiece between the first and second jaw protrusions. The jaws of the vise may be moved such that a first side of the workpiece abuts against the first jaw protrusion and a second side of the workpiece abuts against a second jaw protrusion. In some examples, the second side of the workpiece may be opposite the first side.

In some embodiments, the surface of the stationary jaw is a top surface of the stationary jaw, and the surface of the movable jaw is a top surface of the movable jaw. In some embodiments, securing the workpiece between the first and second jaw protrusions further comprises supporting the workpiece with portions of the top surfaces of the movable and stationary vise jaws.

In some embodiments, the first jaw protrusion may be machined to correspond to a first shape of a first side of a workpiece, and the second jaw protrusion may be machined to correspond to a second shape of a second side of a workpiece.

In some embodiments, the vise can be secured to a CNC machine, where the CNC machine deposits the depositing material onto the surface of the movable jaw, deposits the depositing material onto the surface of the stationary jaw, and machines the workpiece with the vise secured to the work surface on the CNC machine.

In some embodiments, the method can include removing the workpiece, where the workpiece has a first shape. A new workpiece having the first shape can be secured between the first and second jaw protrusions. The new workpiece can be machined. Removing the previously machined workpiece, securing a new workpiece, and machining the new workpiece can be repeated until a desired number of workpieces are machined. In some embodiments, at least one of: removing the previously machined workpiece and securing the new workpiece includes manipulating the previously machined workpiece, the new workpiece, or both with one or more robotic arms. In some embodiments, removing the previously machined workpiece, securing a new workpiece, and machining the new workpiece are performed by a CNC machine.

This disclosure may also provide methods for forming and using one or more workpiece securing devices that include depositing a material onto a surface of a movable jaw of a vise to form a first jaw protrusion and depositing the material onto a surface of a stationary jaw of the vise to form a second jaw protrusion. The method can include securing one or more first workpieces having a first shape between the first and second jaw protrusions. The one or more first workpieces can then be machined. The one or more first workpieces can be removed from between the first and second jaw protrusions. The one first and second jaw protrusions can then be removed by cutting off the deposited material. A second material can be deposited onto the surface of the movable jaw to form a third jaw protrusion, and the second material can be deposited onto the surface of a stationary jaw to form a fourth jaw protrusion. One or more second workpieces having a second shape can then be secured between the third and fourth jaw protrusions. The one or more second workpieces can be machined.

In some embodiments, the method may include machining the first and second jaw protrusions to follow a first curvature of a first side and a second curvature of a second side of the one or more first workpieces having a first shape. Similarly, the third and fourth jaw protrusions can be machined to correspond to a third curvature of a first side and a fourth curvature of a second side of the one or more second workpieces having a second shape.

In some embodiments, the surface of the stationary jaw of the vise is a top surface of the stationary jaw, and the surface of the movable jaw of the vise is a top surface of the movable jaw. In some embodiments, securing the one or more first and second workpieces between the first and second jaw protrusions further comprises supporting one or more first and second workpieces with portions of top surfaces of the movable and stationary vise jaws. In some embodiments, the first shape, e.g., of the one or more first workpieces, is different from the second shape, e.g., of the one or more second workpieces.

In some embodiments, a CNC machine can be programmed to deposit the first and second jaw protrusions, securing the one or more first workpieces, and machining the one or more first workpieces. In some embodiments, the CNC machine can be programmed to remove the first and second jaw protrusions, form the third and fourth jaw protrusions, secure the one or more second workpieces, and machine the one or more second workpieces.

In some embodiments, securing and machining the one or more first workpieces and securing and machining the one or more second workpieces include manipulating the one or more first workpieces and the one or more second workpieces with a robotic arm.

In some embodiments, securing and machining the one or more first workpieces includes securing a first of the one or more first workpieces between the first and second jaw protrusions. The method may also include machining the first of the one or more first workpieces. The method may also include removing the first of the one or more first workpieces. The method may also include securing a new workpiece of the one or more first workpieces between the first and second jaw protrusions. The method may also include machining the new workpiece. Removing the previously machined workpiece, securing the new workpiece, and machining the new workpiece can be repeated until a desired number of the one or more first workpieces are machined.

In some embodiments, securing and machining the one or more second workpieces includes securing a first of the one or more second workpieces between the first and second jaw protrusions. The method can also include machining the first of the one or more second workpieces. The method can also include removing the first of the one or more second workpieces. The method can also include securing a new workpiece of the one or more second workpieces between the first and second jaw protrusions. The method can also include machining the new workpiece. Removing the previously machined workpiece, securing the new workpiece, and machining the new workpiece can be repeated until a desired number of the one or more second workpieces are machined.

Methods in accordance with this disclosure include a method for forming a workpiece securing device. The method can include depositing material onto a top surface of a movable jaw of a vise to form a first jaw protrusion and depositing material onto a top surface of a stationary jaw of the vise to form a second jaw protrusion. The first jaw protrusion can be machined to correspond to a first side of a workpiece to be secured between the first and second jaw protrusions, and the second jaw protrusion can be machined to correspond to a second side of the workpiece to be secured between the first and second jaw protrusions.

A workpiece securing device for securing one or more workpieces in accordance with this disclosure may include a body having a guideway, a first jaw coupled to the guideway and a second jaw coupled to the guideway. The workpiece securing device may further include a first jaw protrusion permanently attached to a first surface of the first jaw. A shape of the first jaw protrusion can correspond to a shape of a first contact portion of the one or more workpieces to be secured. The workpiece securing device may further include a second jaw protrusion permanently attached to a second surface of the first jaw. A shape of the second jaw protrusion can correspond to a shape of a second contact portion of the one or more workpieces to be secured.

In some embodiments, the first surface may be a top surface of the first jaw and a second surface may be a top surface of the second jaw. In some embodiments, the first jaw and/or second jaw may be configured to move along the guideway. In some embodiments, the first jaw attachment can be configured to be machined while permanently attached to the first jaw. In some embodiments, the second jaw attachment can be configured to be machined while permanently attached to the second jaw.

Although examples of the disclosure have been fully described with reference to the accompanying drawings, it is to be noted that various changes and modifications will become apparent to those skilled in the art. For example, the shape of the jaw-top attachments and workpieces are not limited to the shapes illustrated in the drawings. A skilled artisan will understand that jaw-top attachments can be formed to secure workpieces of any shape. For example, a jaw-top attachment may be formed to secure a side of the workpiece that is curved along the y-axis. Such changes and modifications are to be understood as being included within the scope of examples of the disclosure as defined by the appended claims.

The invention claimed is:

1. A method for forming and using a workpiece securing device, comprising:
    depositing a material onto a surface of a movable jaw of a vise to form a first jaw protrusion of the workpiece securing device;
    depositing the material onto a surface of a stationary jaw of the vise to form a second jaw protrusion of the workpiece securing device;
    securing one or more first workpieces having a first shape between the first and second jaw protrusions;
    machining the one or more first workpieces;
    removing the one or more first workpieces from between the first and second jaw protrusions;
    removing the first and second jaw protrusions by cutting off the deposited material;
    depositing a second material onto the surface of the movable jaw to form a third jaw protrusion;
    depositing the second material onto the surface of the stationary jaw to form a fourth jaw protrusion;
    securing one or more second workpieces having a second shape between the third and fourth jaw protrusions; and
    machining the one or more second workpieces.

2. The method of claim 1, wherein the surface of the stationary jaw of the vise is a top surface, and wherein the surface of the movable jaw of the vise is a top surface.

3. The method of claim 1, further comprising:
    machining the first and second jaw protrusions to correspond to a first curvature of a first side and a second curvature of a second side, respectively, of the one or more first workpieces having a first shape; and
    machining the third and fourth jaw protrusions to correspond to a third curvature of a first side and a fourth curvature of a second side, respectively, of the one or more second workpieces having a second shape.

4. The method of claim 3, wherein the first shape is different from the second shape.

5. The method of claim 1, further comprising programing a CNC machine to perform the depositing the first and second jaw protrusions, the securing the one or more first workpieces, and the machining the one or more first workpieces.

6. The method of claim 5, further comprising programing the CNC machine to perform the removing the first and second jaw protrusions, the forming the third and fourth jaw protrusions, the securing the one or more second workpieces, and the machining the one or more second workpieces.

7. The method of claim 1, wherein the securing and the machining the one or more first workpieces comprises:
    securing a first of the one or more first workpieces between the first and second jaw protrusions;

machining the first of the one or more first workpieces;
removing the first of the one or more first workpieces;
securing a new workpiece of the one or more first workpieces between the first and second jaw protrusions;
machining the new workpiece; and
repeating the removing the workpiece, the securing the new workpiece, and the machining the new workpiece until a desired number of the one or more first workpieces are machined.

8. The method of claim 1, wherein the securing and the machining the one or more second workpieces comprises:
securing a first of the one or more second workpieces between the first and second jaw protrusions;
machining the first of the one or more second workpieces;
removing the first of the one or more second workpieces;
securing a new workpiece of the one or more second workpieces between the first and second jaw protrusions;
machining the new workpiece; and
repeating the removing the workpiece, the securing the new workpiece, and the machining the new workpiece until a desired number of the one or more first workpieces are machined.

\* \* \* \* \*